(12) United States Patent
O'Kasick et al.

(10) Patent No.: US 8,740,165 B2
(45) Date of Patent: Jun. 3, 2014

(54) POINT-OF-SALE ORGANIZER

(76) Inventors: Larry O'Kasick, Centerville, MN (US); Kyle Meyer, Champlin, MN (US); Adolf Hans Friedebach, Victoria, MN (US)

(*) Notice: Subject to any disclaimer, the term of this patent is extended or adjusted under 35 U.S.C. 154(b) by 0 days.

(21) Appl. No.: 13/554,001

(22) Filed: Jul. 20, 2012

(65) Prior Publication Data

US 2013/0020445 A1  Jan. 24, 2013

Related U.S. Application Data

(60) Provisional application No. 61/510,627, filed on Jul. 22, 2011.

(51) Int. Cl.
*E04G 3/00* (2006.01)

(52) U.S. Cl.
USPC .................. 248/276.1; 248/919; 312/290

(58) Field of Classification Search
USPC ............. 248/276.1, 282.1, 285.1, 918–920, 248/551–553, 442.2
See application file for complete search history.

(56) References Cited

U.S. PATENT DOCUMENTS

| | | | | |
|---|---|---|---|---|
| 798,539 | A * | 8/1905 | Sternheimer | 248/285.1 |
| 4,620,808 | A * | 11/1986 | Kurtin et al. | 400/83 |
| 5,340,073 | A * | 8/1994 | Masakazu | 248/291.1 |
| 6,108,195 | A * | 8/2000 | Behl et al. | 361/679.23 |
| 8,020,829 | B1 * | 9/2011 | Tamayori | 248/447.2 |
| 2003/0222140 | A1 * | 12/2003 | Wasson | 235/383 |
| 2004/0079849 | A1 * | 4/2004 | Rudolf | 248/276.1 |
| 2006/0055292 | A1 * | 3/2006 | Specht et al. | 312/290 |
| 2007/0235530 | A1 * | 10/2007 | Weisblatt et al. | 235/383 |

* cited by examiner

*Primary Examiner* — Gwendolyn W Baxter
(74) *Attorney, Agent, or Firm* — Kelly, Holt & Christenson, PLLC

(57) ABSTRACT

Embodiments of organizers for point-of-sale systems are disclosed. In one embodiment, an organizer includes a planar surface, a mounting bracket, a pole, and an adjustable arm. The pole illustratively fits within apertures in the planar surface and the mounting bracket, and the adjustable arm is connected to the pole and to a monitor mounting plate. In another embodiment, an organizer includes a surface, a mounting bracket, and a monitor support. The surface is configured to be positioned above a cash drawer and is held in place utilizing a front lip and side lips. The mounting bracket is configured to be positioned below the surface and behind the cash drawer. The monitor support passes through apertures in the surface and the mounting bracket, and is configured to position a monitor relative to the cash drawer.

13 Claims, 6 Drawing Sheets

POINT-OF-SALE ORGANIZER

REFERENCE TO RELATED CASE

The present application is based on and claims the priority of provisional application Ser. No. 61/510,627 filed on Jul. 22, 2011, the content of which is hereby incorporated by reference in its entirety.

BACKGROUND

Point-of-sale ("POS") systems can be used for conducting transactions such as sales, exchanges, and returns. POS systems commonly include several components. Some of the components may include a cash drawer, a monitor, a keyboard, and a printer. For example, a salesperson can use a monitor and keyboard to enter information about a transaction. The salesperson can use the cash drawer as necessary to store or retrieve currency, checks, coupons, or other materials involved in the transaction, and the salesperson may then use the printer to print out a receipt for the transaction. POS systems are not however limited to any particular use or setting, and can be used in a wide variety of settings for a wide variety of uses. POS systems are also not limited to any particular components and may include more or fewer components than the described example POS system.

SUMMARY

An aspect of the disclosure relates to organizers for point-of-sale systems. In one embodiment, an organizer includes a planar surface, a mounting bracket, a pole, and an adjustable arm. The pole illustratively fits within apertures in the planar surface and the mounting bracket, and the adjustable arm is connected to the pole and to a monitor mounting plate.

In another embodiment, an organizer includes a surface, a mounting bracket, and a monitor support. The surface is configured to be positioned above a cash drawer and is held in place utilizing a front lip and side lips. The mounting bracket is configured to be positioned below the surface and behind the cash drawer. The monitor support passes through apertures in the surface and the mounting bracket, and is configured to position a monitor relative to the cash drawer.

In yet another embodiment, a method of organizing a point-of-sale system includes placing a top surface of an organizer over a top surface of a cash drawer. A monitor is positioned relative to the cash drawer utilizing an adjustable arm of the organizer, and point-of-sale system components are placed on the organizer top surface.

These and various other features and advantages that characterize the claimed embodiments will become apparent upon reading the following detailed description and upon reviewing the associated drawings.

DETAILED DESCRIPTION

Embodiments of the present disclosure include organizers for POS systems. In at least certain embodiments, organizers are able to integrate cash drawers, monitors, and other POS components in a manner that optimizes the use of available space and allows for flexibility in the positioning of components within the system. For instance, in one embodiment, a rotatable monitor arm allows for a POS system to be arranged in either a left handed or a right handed configuration. Some embodiments may also provide other benefits such as, but not limited to, reducing cabling clutter, making cabling accessible, reducing installation complexity, and increasing the portability of a POS system. Additionally, organizers may be able to accommodate components of different designs and from different manufacturers allowing for more options in selecting components of a POS system.

Figure 1:
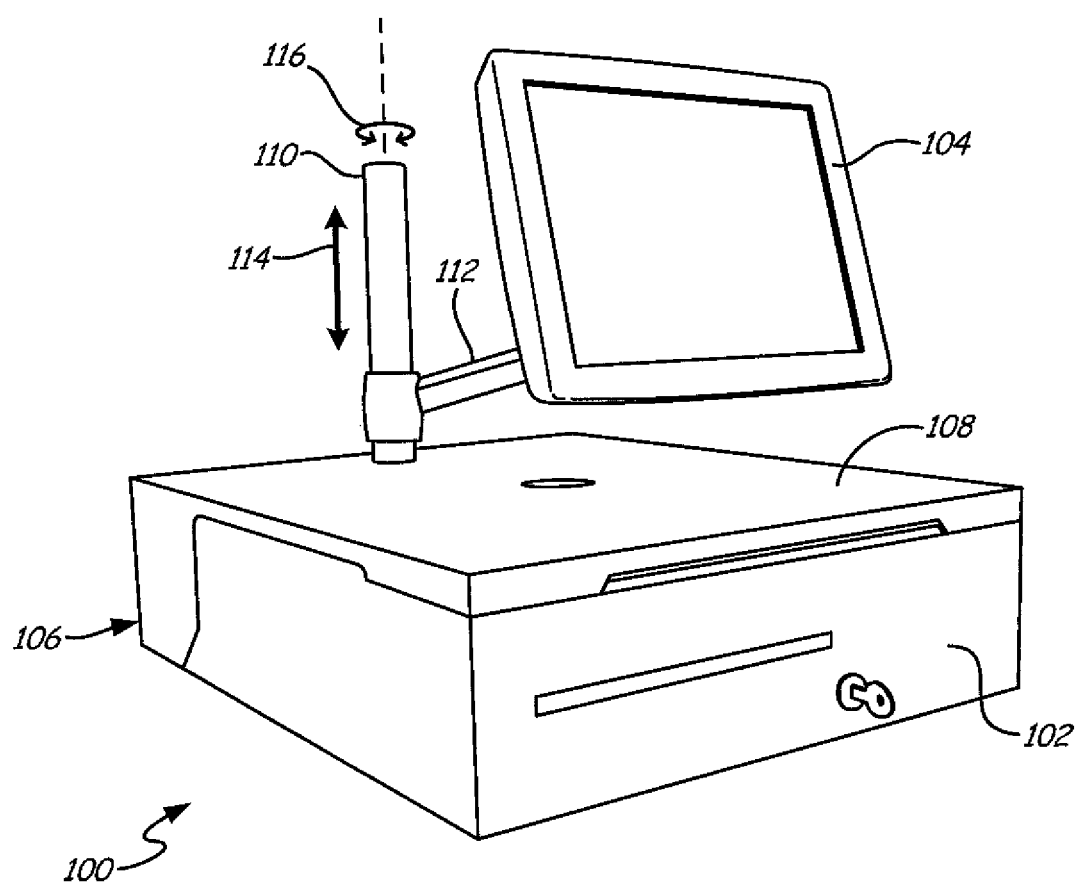
FIG. 1 is a front perspective view of a point-of-sale system utilizing an organizer.

FIG. 1 is a front perspective view of one example of a POS system 100. POS system 100 includes a cash drawer 102, a monitor 104, and an organizer 106. Organizer 106 attaches to cash drawer 102 and supports monitor 104. Organizer 106 includes a top surface 108, a monitor support pole 110, and a monitor positioning arm 112. Top surface 108 provides an open area that allows for other POS components to be placed on top of it. For instance, a keyboard, a printer, and/or other POS components can be placed on surface 108. As can be seen in the figure, monitor support pole 110 only uses a small amount of space of top surface 108. Accordingly, organizer 106 minimizes the space needed to support the monitor, and allows the extra space to be used for accommodating other POS components.

In at least certain embodiments, the positioning of monitor 104 relative to cash drawer 102 may be adjusted. For instance, in the example shown in FIG. 1, monitor 102 can be moved up and down by moving monitor positioning arm 112 along monitor support pole 110 in the directions shown by arrow 114, and monitor 104 can be rotated by rotating monitor positioning arm 112 about monitor support pole 110 in the directions shown by arrow 116. Additionally, as is described in greater detail below, in some embodiments, monitor positioning arm 112 includes additional joints such that the positioning of monitor 104 can be further adjusted. For instance, monitor 104 can illustratively be tilted up or down, or rotated left or right relative to positioning arm 112.

Figure 2:
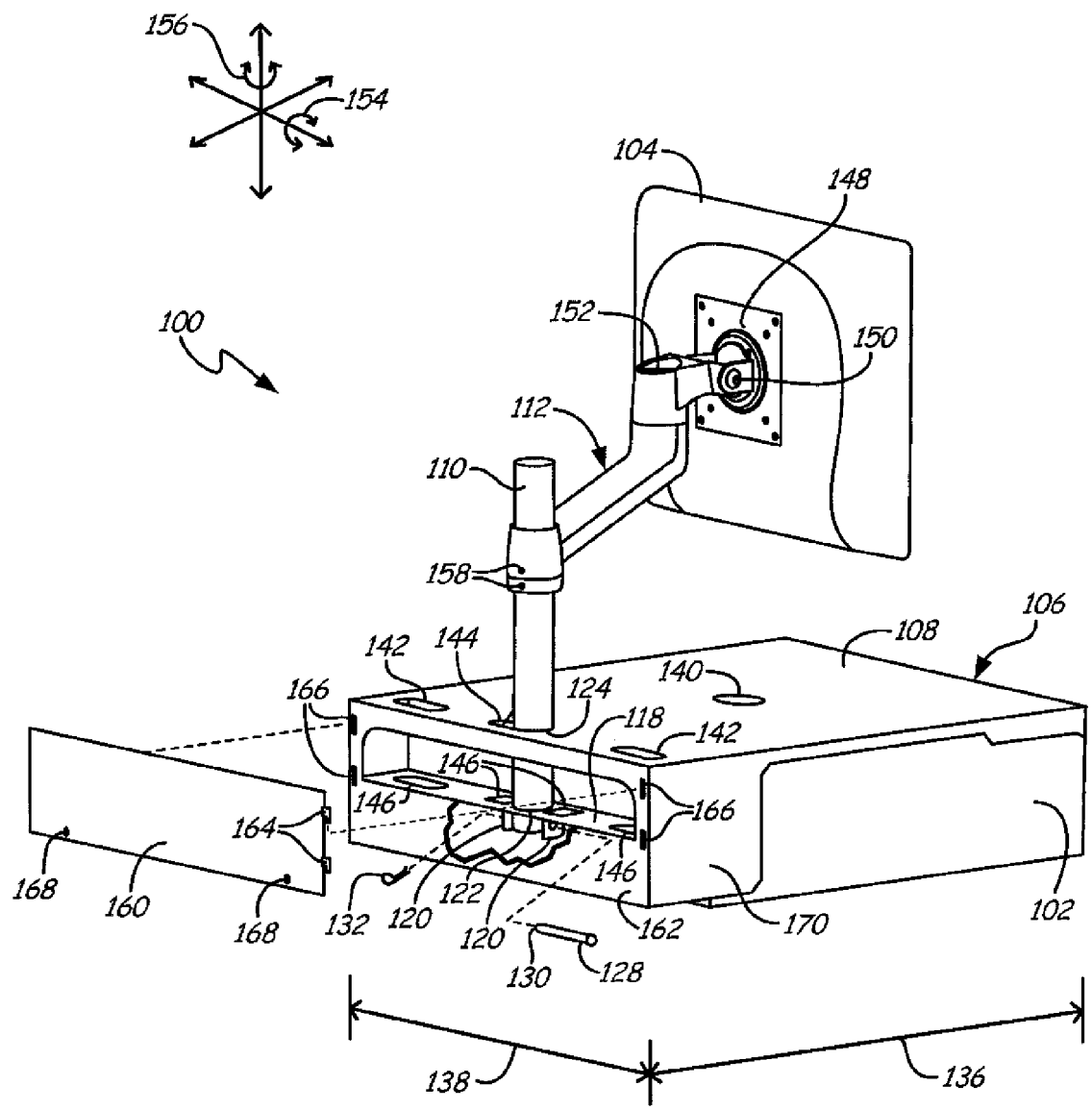
FIG. 2 is back perspective view of a point-of-sale system utilizing an organizer.

FIG. 2 is a back perspective view of the POS system 100 shown in FIG. 1. Organizer 106 illustratively includes a mounting bracket 118 positioned behind cash drawer 102. In one embodiment, mounting bracket 118 includes two flanges 120 and a pole aperture 122 that is located between the two flanges 120. Monitor support pole 110 fits through a pole aperture 122 in top surface 108 and through mounting bracket pole aperture 122. Monitor support pole 110 includes a pin aperture 126 (shown and labeled in FIG. 3) and is held in place by placing a pin 128 through the apertures in the mounting bracket flanges 120 and through pin aperture 126. Accordingly, monitor support pole 110 is securely supported and held in place by apertures 122, 124 and pin 128. Additionally, pin 128 may be held in place by attaching a clip 132 to an aperture 130 in pin 128.

FIG. 2 shows that organizer 106 has a depth 136 and a width 138. In an embodiment, organizer depth 136 is slightly greater than the cash drawer depth such that the organizer can accommodate mounting bracket 118 and monitor support pole 110 behind cash drawer 102, and organizer width 138 is slightly greater than the cash drawer width due to the thickness of the material making the side panels 170. In one particular example, for illustration purposes only and not by limitation, organizer depth 136 is between eighteen and twenty inches, and organizer width 138 is between fourteen and twenty inches. Embodiments are not however limited to any particular dimensions and can be sized as needed based upon the size of the cash drawer 102. As will be recognized by those skilled in the art, the footprint of organizer 106 is relatively small and is only slightly larger than that of cash drawer 102.

Organizer 106 may optionally include a number of apertures that can be used for routing cables through the organizer. For example, organizer 106 in FIG. 1 includes a keyboard aperture 140, printer apertures 142, and a monitor aperture 144. Keyboard aperture 140 is located approximately in the center of the top surface 108 and can be used to route a keyboard cable from a keyboard placed at the front of the organizer. Printer apertures 142 are located approximately at the back corners of the top surface 108 and can be used to route a printer cable from a printer placed at one of the back corners of the organizer. In an embodiment, such as in the one shown in the figure, organizer 106 includes an aperture 142 at both the left side and the right side of the organizer such that a printer can be placed on either the left or right side. Monitor aperture 144 is adjacent to or near the pole aperture 124. Monitor aperture 144 can be used to route cabling from monitor 104. Additionally, mounting bracket 118 may also include apertures 146 for routing cables. The inclusion of cabling apertures may help to reduce the presence of excess cabling around the work area of a person operating the POS system and may also provide a more organized appearance.

One end of monitor positioning arm 112 illustratively includes a monitor plate 148 that is used to attach monitor 104 to the organizer. In one embodiment, monitor plate 148 includes multiple sets of apertures that can be used to attach different sized monitors to the plate using screws (e.g. standard VESA mount hole patterns). Monitor plate 148 is not however limited to any particular method of attaching a monitor, and embodiments of monitor plate 148 include any features that may be used to attach a monitor to the plate.

Monitor position arm 112 may also include one or more joints that allow for further adjustment of the position of monitor 104. In the example shown in FIG. 2, monitor position arm 112 includes a tilt up/down joint 150 and a left/right joint 152. Up/down joint 150 enables monitor 104 to be tilted up and down in the directions shown by arrow 184, and left/right joint 152 enables monitor 104 to be rotated left and right in the directions shown by arrow 178. Additionally, as was previously mentioned, monitor position arm 112 can be moved up and down along monitor support pole 110 and can also be rotated about monitor support pole 110. In one embodiment, monitor position arm 112 is held in place in relation to monitor support pole 110 utilizing one or more set screws 158. The inclusion of one or more joints and the adjustability of monitor position arm 112 allows for flexibility in the positioning of monitor 104. For instance, organizer 106 allows for a POS system to be set-up in either a left handed or a right handed configuration. Also for instance, organizer 106 allows for monitor 104 to be tilted up and down or left and right such that the monitor can be easily viewed by an operator.

Finally with respect to FIG. 2, organizer 106 may include a cover 160 that can be placed over the back plate 162 of the organizer. Cover 160 may help provide a neat and organized appearance for a POS system and may reduce unwanted or unintentional tampering with cables. In one particular embodiment, cover 160 includes tabs 164 that fit into slots 166 of back plate 162. This allows for cover 162 to be easily removed (e.g. without tools) if needed to access cabling or other components within organizer 106. Cover 160 may also include apertures 168 that can be used to screw or bolt cover 160 to back plate 162 if a more secure attachment is desired.

Figure 3:
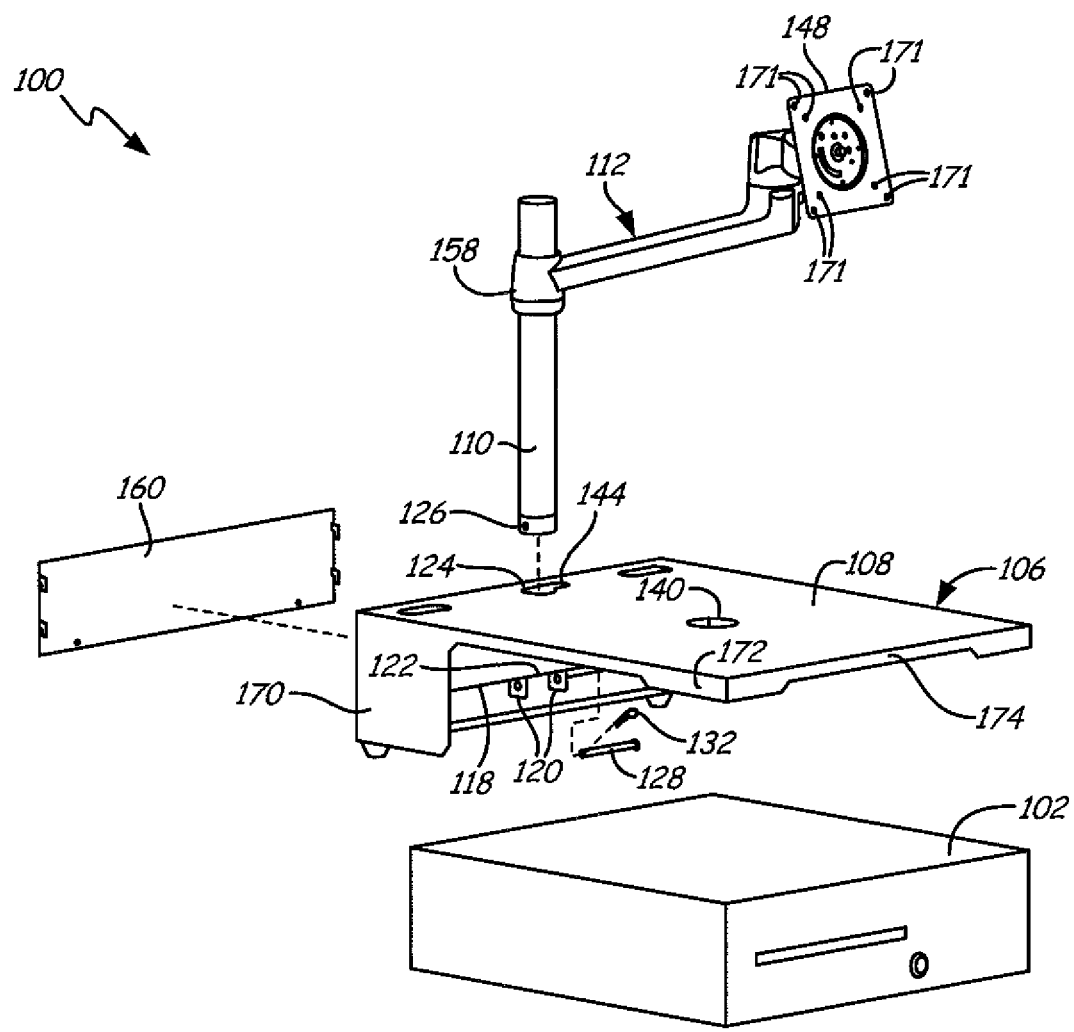
FIG. 3 is an exploded view of an organizer and a cash drawer.

FIG. 3 is an exploded front perspective view of the POS system 100 shown in FIGS. 1-2 without a monitor 102. FIG. 3 shows organizer 106 separated from cash drawer 102. FIG. 3 also shows mounting support pole 110 and cover 160 separated from the rest of organizer 106. As was previously mentioned, mounting support pole 110 illustratively fits within an aperture 124 in the top cover 108 and an aperture 122 in mounting bracket 118. A pin 128 is then passed through apertures in flanges 120 of mounting bracket 118 and through an aperture 126 in monitor support pole 110. Pin 128 is then held in place by a clip 132 or other mechanism.

FIG. 3 shows that organizer 106 includes a side panel 170, a side lip 172, and a front lip 174. Organizer 106 illustratively includes another side panel 170 and side lip 172 on the opposite side of the organizer. Side panels 170, side lips 172, and front lip 174 fit around the sides and front of cash drawer 102 such that the organizer 106 and any attached monitor 102 (shown in FIGS. 1-2) are securely held in place in relation to cash drawer 102. In an embodiment, organizer 106 attaches to cash drawer 102 such that there is a space between the top surface 108 of the organizer 106 and the top surface of the cash drawer 102. This space allows for cables such as a cable through keyboard aperture 140 to be routed through organizer 106. In one particular example, the space between the organizer 106 and cash drawer 102 is approximately one-quarter to one-half inches. Embodiments are not however limited to any particular dimensions and may include more or less space between the organizer and the cash drawer.

FIG. 3 also shows additional views of some of the apertures that may be included within organizer 106. For instance, FIG. 3 shows apertures 171 in monitor plate 148. As can be seen in the figure, apertures 171 illustratively include an inner set of four apertures and an outer set of four apertures (e.g. standard VESA mounting holes). The inclusion of sets of differently spaced apertures 171 enables organizer 106 to accommodate attachment of monitors from different manufacturers and of different sizes. Embodiments of monitor attachment plate 148 may include any number of apertures 171 or other mechanisms that may be needed or useful in attaching a monitor. FIG. 3 further shows that monitor cable aperture 144 may be merged with pole aperture 124 such that the two apertures are formed from one single aperture in top surface 108. In another embodiment however, apertures 144 and 124 are separated from each other for instance by a portion of top surface 108.

Figure 4:
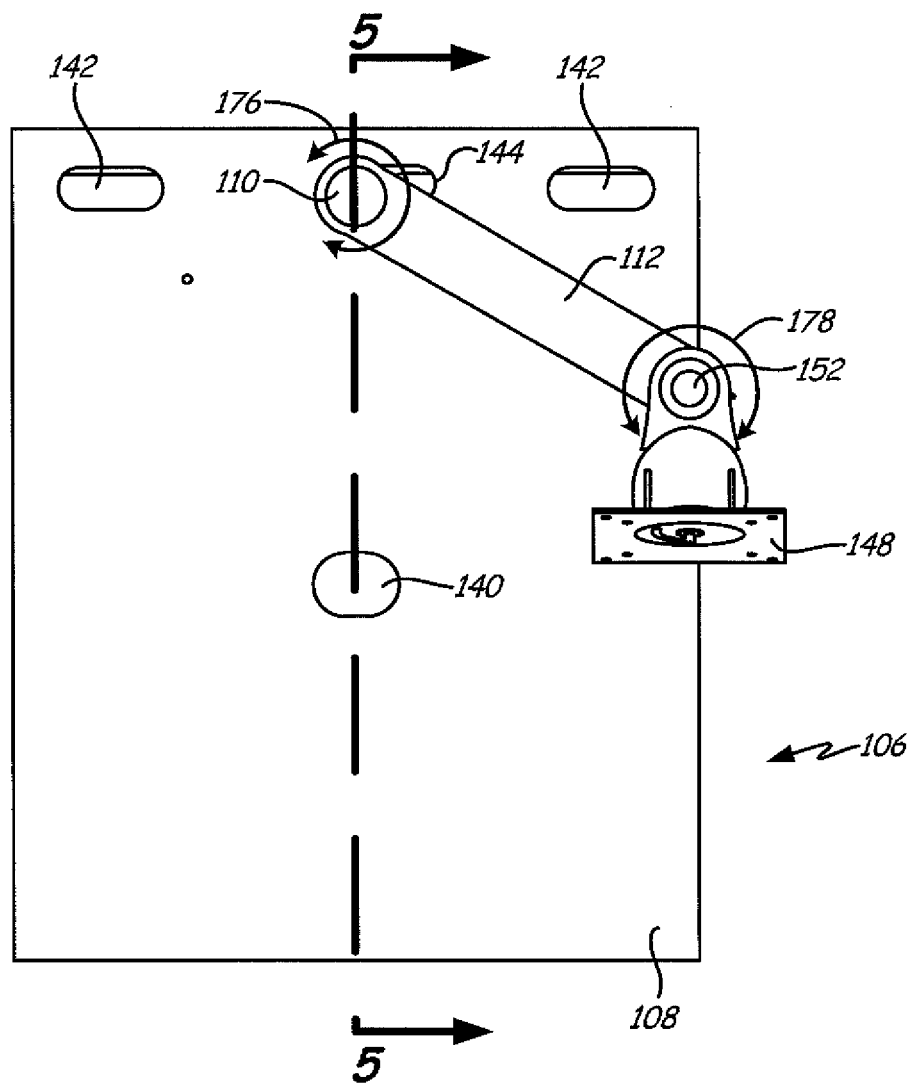
FIG. 4 is a top down view of an organizer.

FIG. 4 is a top down view of organizer 106. FIG. 4 shows that monitor positioning arm 112 is able to rotate about monitor support pole 110 in the directions shown by arrow 176, and that monitor plate 148 is able to rotate about joint 152 in the directions shown by arrow 178. FIG. 4 also shows that top surface 108 has an approximately rectangular shape and that apertures 140, 142, and 144 have approximately oval shapes. Embodiments of top surface 108 and apertures 140, 142, and 144, as well as the other components of organizer 106, are not however limited to any particular shapes and can include any shapes.

Figure 5:
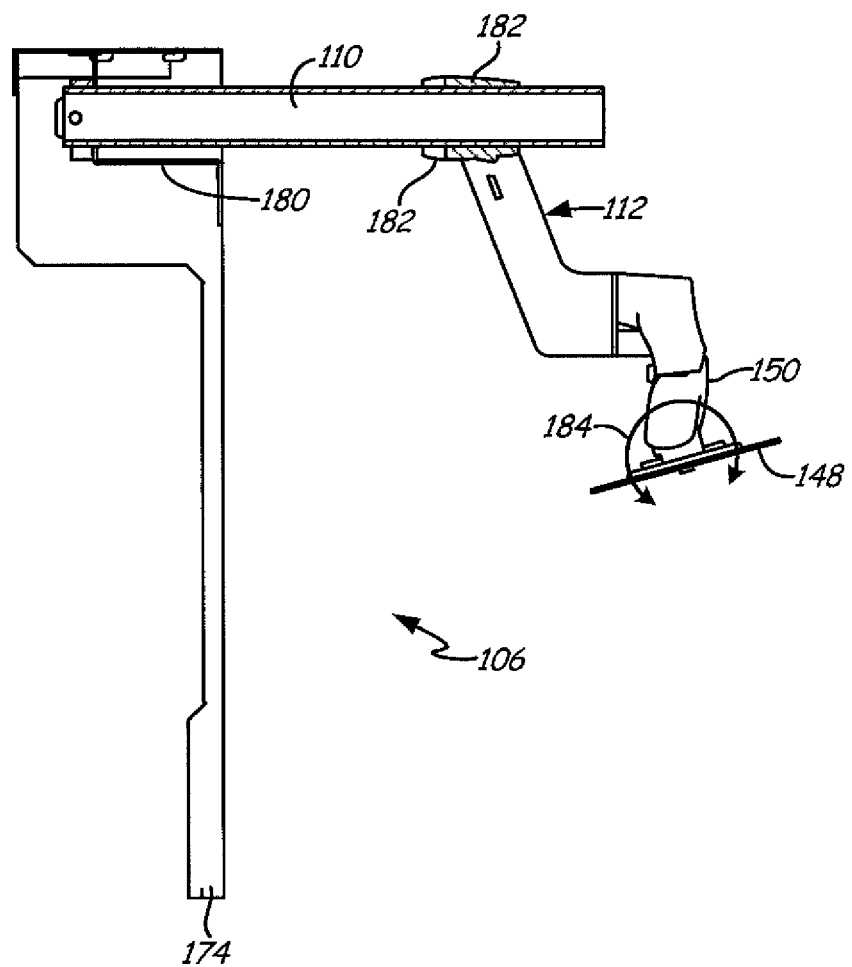
FIG. 5 is a cross-sectional side view of an organizer.

FIG. 5 is a cross-sectional side view of organizer 106 from the perspective of line 5-5 in FIG. 4. FIG. 5 shows that organizer 106 includes a back lip 180. Back lip 180 runs along the width 138 (shown and labeled in FIG. 2) of organizer 106 and is parallel to front lip 174. In one embodiment, back lip 180, front lip 174, and side lips 172 contact the sides of a cash drawer to support the organizer as well as any attached monitor. In such a case, the distance between back lip 180 and front lip 174 is dependent upon the depth of the cash drawer being used with the organizer. For instance, a shorter depth cash drawer would use an organizer with a shorter distance between back and front lips, while a larger depth cash drawer would use an organizer with a larger distance between back and front lips. Embodiments of organizers can include any desired dimensions to accommodate any size cash drawer.

FIG. 5 shows that monitor positioning arm 112 includes a tubular shaped ring 182 that surrounds monitor support pole 110. Ring 182 illustratively maintains the position of monitor support arm 112 relative to monitor support pole 110 by friction generated by the internal surface of ring 182 contacting the exterior surface of pole 110. In the embodiment shown in FIGS. 1-6, monitor support pole 110 and ring 182 have circular shapes. Embodiments of pole 110 and ring 182 are not however limited to any particular shape and include any shapes. For instance, pole 110 and ring 182 could have rectangular shapes. Additionally, embodiments are not limited to any particular method of attaching monitor positioning arm 112 to monitor support pole 110, and embodiments include any method of attaching monitor positioning arm 112 to monitor support pole 110.

FIG. 5 also shows that monitor plate 148 can be rotated or tilted in the directions shown by arrow 184. Accordingly, in at least one embodiment, the position of monitor plate 148 and any attached monitor can be adjusted in four different ways. Monitor plate 148 can be tilted up and down in the directions 184 shown in FIG. 5. Monitor plate 148 can be tilted left and right in the directions 178 shown in FIG. 4. Monitor plate 148 can be moved up and down in the directions 114 shown in FIG. 1, and monitor plate 148 can be rotated about support pole 110 in directions 116 shown in FIG. 1. Embodiments of organizers do not necessarily need to have the four different adjustment methods shown in the figures. Embodiments of organizers illustratively include more or less than the illustrated four methods (e.g. 0, 1, 2, 3, 5, etc.).

Figure 6:
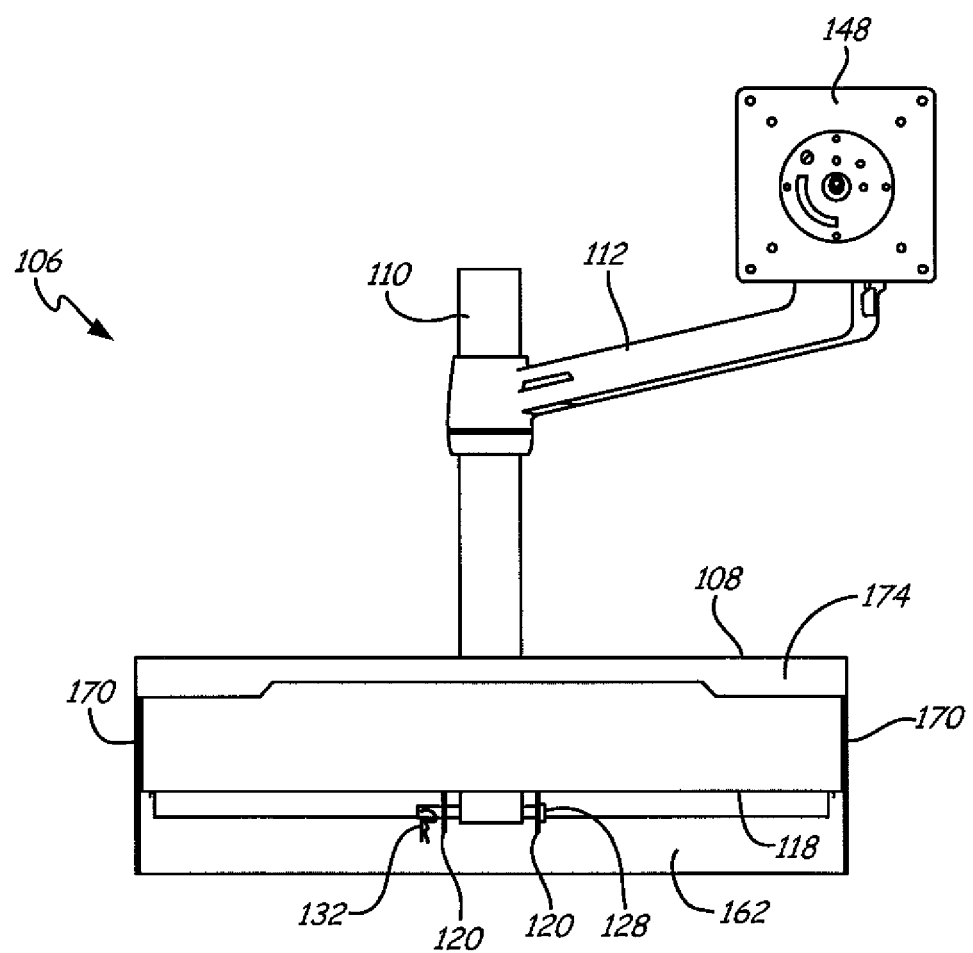
FIG. 6 is a front view of an organizer.

FIG. 6 is a front view of organizer 106. FIG. 6 shows that mounting bracket 118 illustratively runs between and is connected to side panels 170. FIG. 6 also shows an example of pin 128 being placed through the pin aperture of monitor support pole 110 and through the apertures in flanges 120 to hold monitor support pole 110 in place. As previously mentioned, pin 128 is optionally secured by placing a clip 132 through an aperture in the end of the pin. As can be seen in the figure, side panels 170 are parallel or approximately parallel, front lip 174 and back plate 162 are parallel or approximately parallel, and top surface 108 is perpendicular or approximately perpendicular to the side panels 170, front lip 174, and back plate 162. It can also be seen that monitor support pole 110 may be perpendicular or approximately perpendicular to top surface 108. However, in another embodiment, monitor support pole 110 can be at an angle relative to top surface 108. Furthermore, the figure shows that monitor positioning arm 112 may be angled upwards between its connections to monitor support pole 110 and monitor plate 148. Embodiments are again not limited to any particular configuration and monitor positioning arm could be straight, angled downward, or have any other design than what is shown in the specific example in the figures. Additionally, it is worth mentioning that side panels 170, front lip 174, back plate 162, and top surface 108 as well as the other components are in one embodiment made of a metal. Embodiments are not however limited to any particular material and may be made of any material or combination of materials (e.g. metal, plastic, combination of metal and plastic).

As has been described above and shown in the figures, embodiments of organizers can be used to arrange components of a POS system. Organizers are able to integrate cash drawers, monitors, cabling, and other POS components. Advantages of at least some embodiments include the ability to position a monitor and other POS components in a wide variety of different positions, the ability to accommodate POS components of different sizes and types, reducing cabling clutter, reducing installation complexity, and efficiently using available space. Embodiments are not however limited to any particular feature or advantage, and embodiments of the present disclosure include any one or more features or combination of features described in this specification or shown in the drawings.

Finally, it is to be understood that even though numerous characteristics and advantages of various embodiments have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. In addition, although the embodiments described herein are directed to POS systems, it will be appreciated by those skilled in the art that the teachings of the disclosure can be applied to other types of organizers, without departing from the scope and spirit of the disclosure.

What is claimed is:

1. An organizer for a point-of-sale system comprising:
   a planar surface having a first aperture;
   a mounting bracket having a second aperture, wherein the mounting brackets has flanges and each of the flanges has an aperture;
   a pole that fits within and is supported by the first and the second apertures, wherein the pole has an aperture, and wherein a pin is passed through the pole aperture and through the apertures in the mounting bracket flanges;
   an adjustable arm connected to the pole; and
   a monitor mounting plate connected to the adjustable arm.

2. The organizer of claim 1, wherein the pin is held in place by a clip.

3. The organizer of claim 1, and further comprising:
   a first joint between the monitor mounting plate and the adjustable arm that enables the monitor mounting plate to be rotated in a first direction in relation to the adjustable arm.

4. The organizer of claim 3, and further comprising:
   a second joint between the monitor mounting plate and the adjustable arm that enables the monitor mounting plate to be rotated in a second direction in relation to the adjustable arm.

5. The organizer of claim 1, wherein the adjustable arm is moveable along a length of the pole.

6. The organizer of claim 1, wherein the planar surface includes a plurality of cabling apertures.

7. An organizer for a point-of-sale system comprising:
   a surface that is configured to be positioned above a cash drawer and held in place in relation to the cash drawer utilizing a front lip and side lips;
   a mounting bracket that is configured to be positioned below the surface and behind the cash drawer, wherein the mounting bracket includes a plurality of cabling apertures; and
   a monitor support that passes through apertures in the surface and the mounting bracket, the monitor support being configured to position a monitor relative to the cash drawer.

8. The organizer of claim 7, wherein the monitor support includes a plurality of joints that enable a position of the monitor relative to the cash drawer to be adjusted.

9. The organizer of claim 7, wherein the monitor support includes a pole and an arm, and wherein a position of the arm along a length of the pole is adjustable.

10. The organizer of claim 9, wherein the arm is rotatable around the pole.

11. The organizer of claim 9, wherein the pole is positioned at a center of a width of the surface.

12. The organizer of claim 7, wherein the surface includes a plurality of cabling apertures.

13. The organizer of claim 7, wherein the monitor support includes a monitor plate, and wherein the monitor plate includes a plurality of sets of apertures for mounting monitors.

\* \* \* \* \*